(12) United States Patent
Kobayashi

(10) Patent No.: US 8,035,264 B2
(45) Date of Patent: Oct. 11, 2011

(54) MOTOR

(75) Inventor: Kazutaka Kobayashi, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 52 days.

(21) Appl. No.: 12/652,884

(22) Filed: Jan. 6, 2010

(65) Prior Publication Data

US 2010/0181852 A1    Jul. 22, 2010

(30) Foreign Application Priority Data

Jan. 19, 2009  (JP) ................................ 2009-009271

(51) Int. Cl.
*H02K 1/18*    (2006.01)

(52) U.S. Cl. ..................... 310/71; 310/49.11; 310/49.13

(58) Field of Classification Search .................... 310/71, 310/49.11, 49.13, 49.15–49.17, 257
See application file for complete search history.

(56) References Cited

U.S. PATENT DOCUMENTS

| | | | | |
|---|---|---|---|---|
| 5,004,941 A | * | 4/1991 | Ohzeki et al. | ............. 310/49.13 |
| 5,770,900 A | * | 6/1998 | Sato et al. | ................. 310/49.13 |
| 5,845,390 A | * | 12/1998 | Cheng et al. | .................... 29/596 |
| 6,909,208 B2 | * | 6/2005 | Suzuki et al. | ............. 310/49.13 |

FOREIGN PATENT DOCUMENTS

JP       2003-088062       3/2003

* cited by examiner

*Primary Examiner* — Dang D Le (74) *Attorney, Agent, or Firm* — Frommer Lawrence & Haug LLP (57) ABSTRACT

The invention provides a motor including a terminal block that is insert molded into a core, so as to increase the strength to support the terminal block. A stator has paired inner cores configured by two inner cores facing back to back and each having a disk part and pole teeth. Each of the disk parts is provided with a terminal block holding part. The terminal block is connected with the terminal block holding parts via a resin connection part that is insert molded. The terminal block holding parts are provided with recesses configured by cut-outs in portions to face the terminal block, respectively. The resin connection part has a thickness increased by filling the recesses so as to increase the strength at a connection portion thereof. The cutouts in the terminal block holding parts facing back to back are offset with respect to a radial line, terminal block facing ends are generally spaced apart from the terminal block by a constant distance. Therefore, the terminal block is prevented from being unstable.

4 Claims, 6 Drawing Sheets

MOTOR

CROSS REFERENCE TO RELATED APPLICATIONS

The present application claims priority from Japanese Patent Application No. 2009-009271 filed on Jan. 19, 2009, the disclosure of which is hereby incorporated by reference in its entirety.

BACKGROUND OF THE INVENTION

1. Field of the Invention

The present invention relates to a motor, particularly to a small motor having a distinctive connection structure between a core and a terminal block.

2. Description of Related Art

Recently, a small stepping motor for driving a head of an FD, a CD, or a DVD have been in use. Among the stepping motors for such purposes, motors each having a diameter of at most 12 mm with double-layered coils are widely available. In Japanese Unexamined Patent Publication No. 2003-88062, the applicant of the present invention previously proposed a motor, which is based on a stepping motor of this type. This motor includes a rotor that has a rotation shaft and magnets fixed to the rotation shaft, a stator that has paired inner cores and outer cores also serving as a case, and a resin coil bobbin that is molded integrally with the paired inner cores so as to allow coils to be wound therearound.

The paired inner cores each include a disk part and pole teeth that axially extend from an inner circumferential edge of the disk part. Two cores configuring the paired inner cores are wrapped with a resin such that the disk parts face back to back, and the coil bobbin is formed to have coil winding parts axially on respective sides, thereby obtaining an insert molded component. Terminal pins to be connected with the coils are supported by a terminal block that is molded simultaneously with the coil bobbin.

Figure 7A:
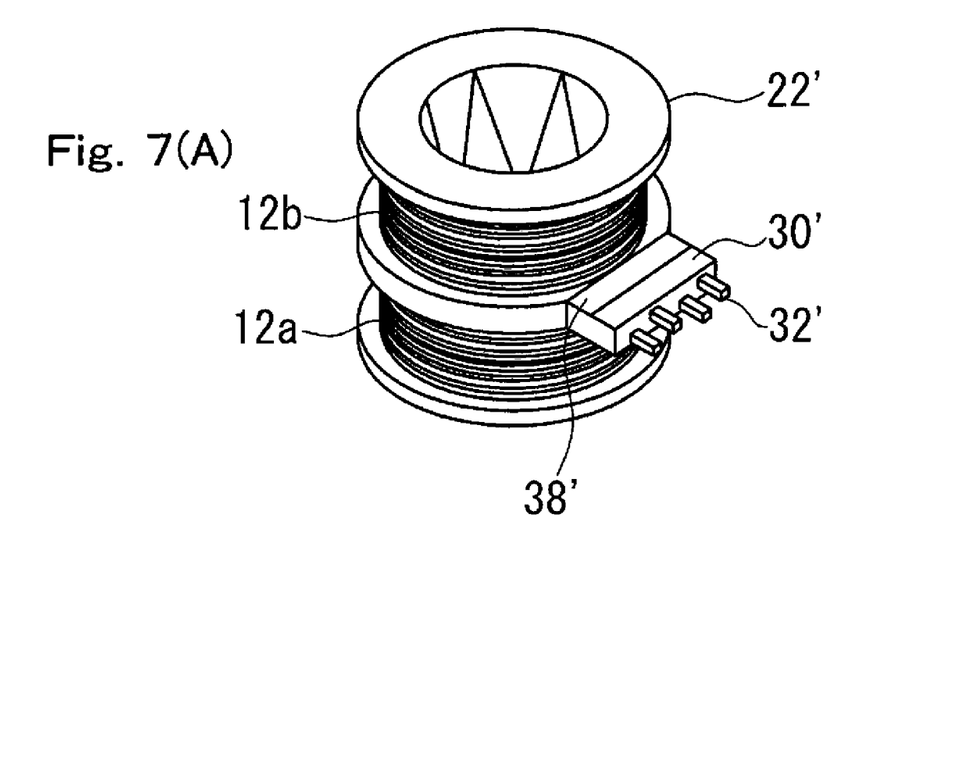
FIGS. 7A and 7B are diagrams showing a conventional art.
Figure 7B:
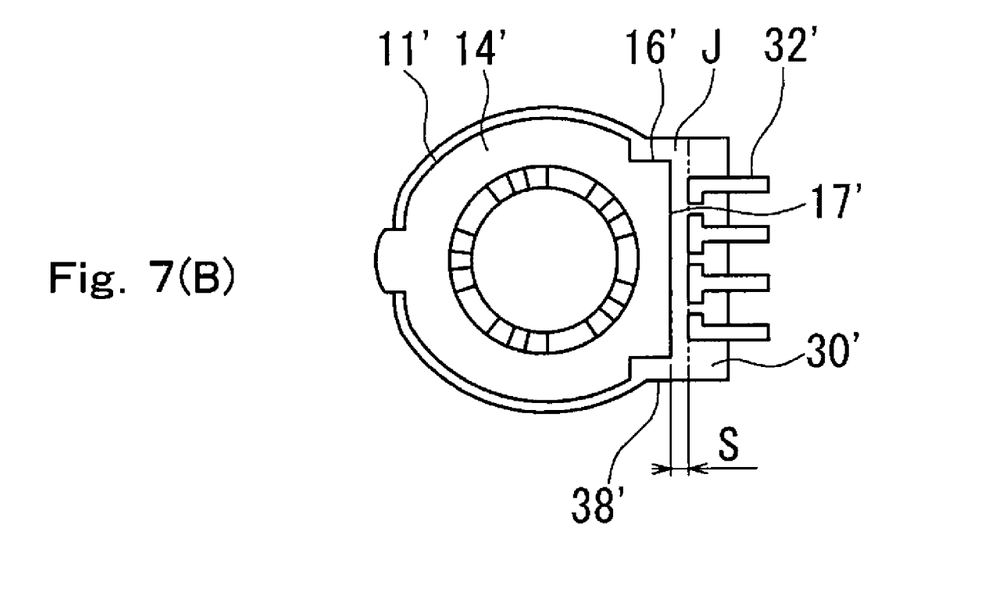

FIG. 7A is a perspective view showing an outer appearance of the insert molded component, and FIG. 7B is a view showing a structure of a portion where the terminal block is connected. Terminal pins 32' to be connected with coils 12a and 12b are supported by a terminal block 30' that which is continuously provided to a tip end of an extending part 38' extending outward from a portion corresponding to disk parts of a coil bobbin 22'. The extending part 38' surrounds with a resin "J" a terminal block holding part 16' that extends from disk parts 14' of paired inner cores 11'. The terminal block holding part 16' has a straight terminal block facing end 17' to face the terminal block 30'.

It is desired to further the reduction in size of the small motors. Reduction in size of the terminal block and the periphery thereof inevitably results in reduction of a space "S" between base ends of the terminal pins 32' and the terminal block holding part 16' of the paired inner cores 11', as well as reduction in width, namely thickness, of the resin "J" that wraps the terminal block holding part 16'. However, as the width of the resin "J" is reduced to cause reduction in thickness thereof, the strength to support the terminal block 30' with respect to the paired inner cores 11' is reduced, such that the terminal block is more easily damaged.

SUMMARY OF THE INVENTION

It is therefore an object of the present invention to provide a motor capable of securing the strength to support a terminal block with respect to paired inner cores in spite of further reduction in size of the motor. The present invention provides a motor having: a rotor including a rotation shaft and a magnet thereon; a stator including a core provided with pole teeth on an inner circumference to surround the magnet, and a coil wound around outer peripheries of the pole teeth; and a terminal block for supporting a plurality of terminal pins to be connected with ends of the coil, wherein the core has a terminal block holding part, the terminal block is located radially outside the terminal block holding part so as to be connected with the terminal block holding part via a resin connection part, and the terminal block holding part has a recess axially opened and filled by the resin connection part. In this structure, the resin connection part fills the recess so as to be thickened on the terminal block holding part connected with the terminal block. A difference in height provided between the outer face of the terminal block holding part and the recess serves as a portion to hook the resin filled in the recess, so that the strength to support the terminal block is increased to reduce possibility of bending of or damages to the connection portion.

Particularly, the core can have the pole teeth in two layers directed axially in directions opposite from each other, and the terminal block holding part has the recess opened axially in one direction in correspondence with the pole teeth in one of the layers, and another recess opened axially in another direction in correspondence with the pole teeth in the other layer. In this case, the recesses provided on the respective ends in the axial direction allow the resin connection part to have a large thickness and hook portions on the respective faces thereof, thereby particularly increasing the strength to hold the terminal block.

Preferably, the core is divided into two cores in a pair each having a plate-shaped base part and the pole teeth directed axially in one of the directions from the base part that has the terminal block holding part, the base parts of the paired cores facing back to back, and each of the terminal block holding parts is provided with a cutout, and the cutout formed in one of the terminal block holding parts serves as the recess opened axially in one direction, while the cutout formed in the other terminal block holding part serves as the recess opened axially in the other direction. In this structure, the core provided with the double-layered pole teeth can be formed by simple pressed members.

Desirably, the base part of each of the two cores has a disk part provided with the pole teeth on an inner circumference thereof, and the terminal block holding part extends outward from the disk part with a predetermined width so as to have a terminal block facing end perpendicular to a radial line from a center of the disk part, the cutout is formed in the terminal block facing end, and a center in a length of the cutout along the terminal block facing end is offset with respect to the radial line, and each of the recesses formed in the corresponding terminal block holding part has a bottom sealed at least partially by the other terminal block holding part.

In this structure, in the paired cores configured by the two cores identically structured and placed to face back to back, even in a case where the terminal block facing end of one of the cores fails to secure a predetermined space from the terminal block due to the cutout formed therein, the terminal block facing end of the other core secures the predetermined space from the terminal block. Therefore, most of the terminal block facing ends can be spaced apart from and parallel to the terminal block by a constant distance, resulting in preventing the terminal block from being unstable. The cutouts in the two cores attached to each other are offset in directions different from each other. As a result, there is exerted an effect similar to that obtained by formation of a wide-ranged cutout.

Since the bottom of each of the recesses is sealed by the other terminal block holding part while the recesses are formed by the cutouts, it is possible to secure an area of contact between the resin connection part and the terminal block holding parts, which increases the strength to support the terminal block.

Desirably, four terminal pins are provided as the plurality of terminal pins, two of the pins of first and third from an outermost end in a width direction of the terminal block are located on a plane identical with that of the terminal block holding part of one of the inner cores, while the remaining two pins are located on a plane identical with that of the terminal block holding part of the other inner core, and when viewed in a direction parallel to the radial line, the two terminal pins on the plane identical with that of one of the terminal block holding parts are disposed so as to be spaced apart from the remaining two terminal pins on the plane identical with that of the other terminal block holding part with the recesses being interposed therebetween. The two terminal pins on the plane identical with that of each of the terminal block holding parts do not face the recess provided in this terminal block holding part but are located adjacent to the terminal block holding part while facing the linear portion of the terminal block facing end. Therefore, heat can be effectively released from the terminal pins to the terminal block holding part without being disturbed by the recess.

Preferably, the cutouts, which configure the respective recesses, each run from one side to another side across the radial line, and the cutouts in the two cores facing back to back are partially overlapped with each other, and the resin connection part filling the recesses of the respective terminal block holding parts is continuously provided in an overlapped portion between the cutouts. The resin connection part on the both outer faces of the terminal block holding parts is continuously provided to fill the spaces between the terminal block facing ends and the terminal block, and is also continuously provided in the overlapped portion between the cutouts. Therefore, securely prevented is separation of the resin connection part from the cores, and increased is the strength to support the terminal block upon receipt of an external force.

Possibly, the stator includes a resin coil bobbin insert molded so as to have the pole teeth on an inner periphery of a through hole for the rotor to pass therethrough, and a coil winding part on the outer peripheries of the pole teeth, and resin connection part and the coil bobbin are connected with each other to form an integral insert molded component. In comparison to a terminal block simply fixed to a core, the strength is increased as the terminal block is provided integrally with the coil bobbin via the resin connection part. The coil bobbin is formed into a circular ring shape and the connection portion of the resin connection part extends in the width (lateral) direction of the terminal block, thereby being strong particularly against an external force in the lateral direction. In addition, the number of components is reduced and the work of assembling the motor is thus facilitated.

According to the present invention, the resin connection part on the terminal block holding part to be connected with the terminal block has a thickness increased by filling the recess. Further, the difference in height provided between the outer face of the terminal block holding part and the recess serves as the portion to hook the resin of the resin connection part filling the recess so as to realize complex joining. Therefore increased is the strength to support the terminal block with less possibility of bending of or damages to the terminal block caused by an external force applied to the terminal block.

DETAILED DESCRIPTION OF THE PREFERRED EMBODIMENTS

Figure 1:
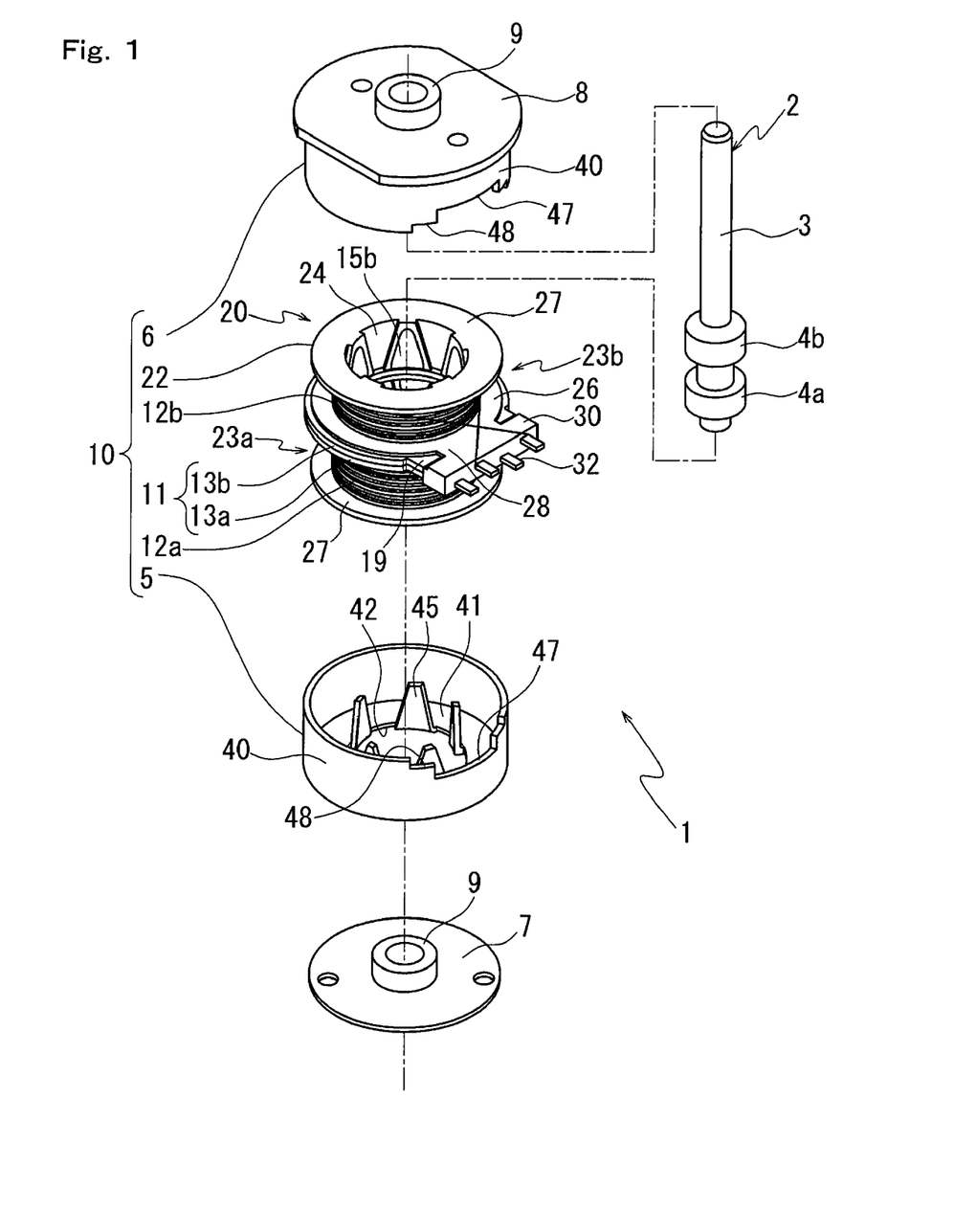
FIG. 1 is a perspective view of an exploded stepping motor according to an embodiment.

Described below are embodiments of the present invention. FIG. 1 is a perspective view of an exploded stepping motor according to an embodiment. Referring to FIG. 1, a stepping motor 1 includes a rotor 2, a stator 10, as well as a first case 5 and a second case 6 each covering the stator 10. The rotor 2 is provided with a rotation shaft 3 and magnets 4a and 4b fixed to the rotation shaft. The magnets 4a and 4b are located axially in correspondence with positions of coils 12a and 12b (to be described later), respectively.

The stator 10 includes an axially lower stator member and an axially upper stator member. The axially lower stator member is configured by the coil 12a wound around a coil bobbin 22 into a circular ring shape, an inner core 13a and an outer core also serving as the first case 5, which are disposed axially on respective sides of the coil 12a. The axially upper stator member is configured by the coil 12b wound around the coil bobbin 22 into a circular ring shape, an inner core 13b and an outer core also serving as the second case 6, which are disposed axially on respective sides of the coil 12b. In short, the stepping motor 1 according to the present embodiment includes the axially lower stator member and the axially upper stator member, which are axially stacked to form two layers into a cylindrical shape.

The coil bobbin 22 is provided as an insert molded component 20 of a resin and paired inner cores 11 that include the inner cores 13a and 13b in the respective layers. Each of the first case 5 and the second case 6 also serves as the outer core as described above. The stator 10 functionally includes as a stator core thereof, the paired inner cores 11, the first case 5 and the second case 6 that are provided as the outer cores. However, in order to simplify the following description, the first case 5 and the second case 6 are regarded as parts to cover the stator, and what is referred to as the stator 10 is a part including the paired inner cores 11, the coil bobbin 22 on the outer circumferences of the paired inner cores, and the coils 12a and 12b wound around the coil bobbin.

The insert molded component 20 has a through hole 21 (see FIGS. 3A and 3B to be referred to later) to allow the rotor 2 to axially pass therethrough, and is provided with the coil bobbin 22 that has two coil winding parts 23a and 23b axially formed on the outer circumferences of the paired inner cores 11. The coil winding parts 23a and 23b allow the coils 12a and 12b to be wound therearound, respectively. Provided lateral to (perpendicularly to the axial direction) a connection portion between the two coil winding parts 23a and 23b of the coil bobbin 22 is a terminal block 30, from an outer end face of which terminal pins 32 protrude.

Figure 2:
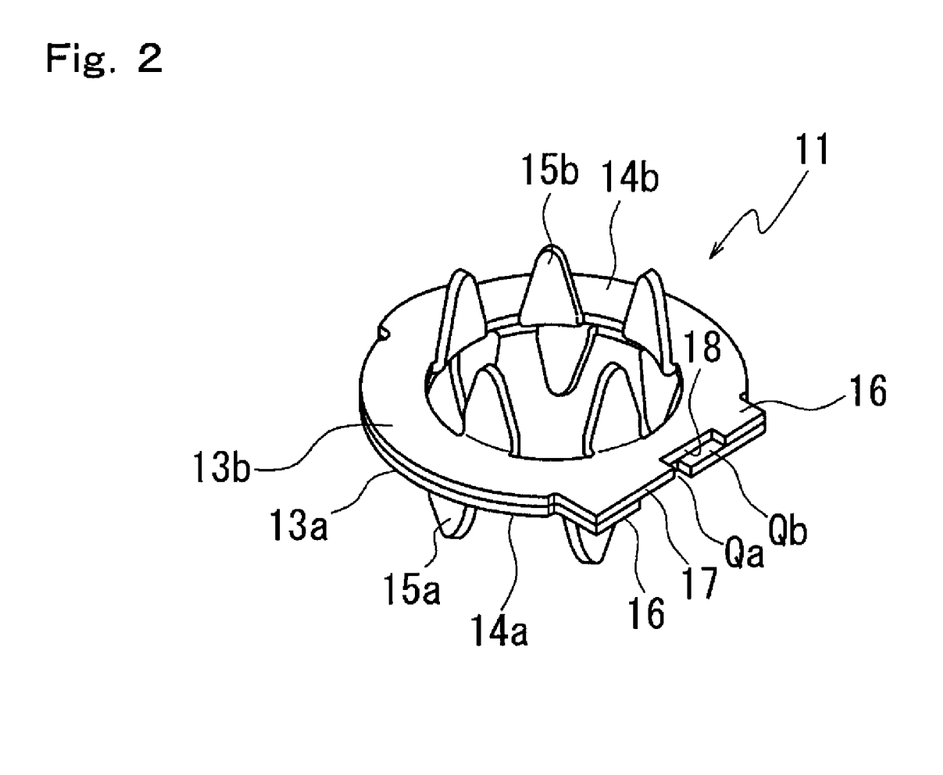
FIG. 2 is a perspective view showing an outer appearance of paired inner cores.

As shown in FIG. 2, the paired inner cores 11 include the inner cores 13a and 13b in the respective layers. The inner cores 13a and 13b have disk parts 14a and 14b, as well as pole teeth 15a and 15b that axially extend from inner circumferential edges of the disk parts 14a and 14b, respectively. The paired inner cores 11 are molded by inserting the identically structured inner cores 13a and 13b into a resin such that the disk parts 14a and 14b face back to back with the pole teeth 15a and 15b extending in the opposite directions. The pole teeth 15a and 15b of the paired inner cores 11 (the inner cores 13a and 13b) are provided at regular intervals in the circumferential direction of the inner cores. In the present embodiment, there are provided five pole teeth. The pole teeth 15a and 15b are disposed in the through hole 21 so as to coincide with the inner peripheral face of the through hole.

As shown in FIG. 1, the outer appearance of the first case 5 has a bottomed cylindrical shape with one end opened, and a cylindrical part 40 is placed to cover the outer periphery of the first coil winding part 23a of the insert molded component 20. An end wall 41 serving as the bottom of the cylindrical part 40 is provided with a hole 42, and pole teeth 45 extend from an inner peripheral edge of the hole 42 into the through hole 21 of the insert molded component 20. The pole teeth 45 of the first case 5 are provided at regular intervals in the circumferential direction.

In a state where the cylindrical part 40 is placed to cover the outer periphery of the coil winding part 23a, the pole teeth 45 are each located between the adjacent pole teeth 15a of the paired inner cores 11. Similarly, the outer appearance of the second case 6 has a bottomed cylindrical shape with one end opened, and a cylindrical part 40 thereof is placed to cover the outer periphery of the second coil winding part 23b of the insert molded component 20.

Although not shown in FIG. 1, similarly to the first case 5, the second case 6 is provided with a hole in an end wall serving as the bottom of the cylindrical part 40. There are also provided pole teeth 45 (see FIG. 3C) that extend from an inner peripheral edge of the hole into the through hole 21. The cylindrical part 40 is placed to cover the outer periphery of the second coil winding part 23b. Similarly to the above, the pole teeth 45 of the second case 6 are each located between the adjacent pole teeth 15b of the paired inner cores 11.

The first case 5 and the second case 6 are provided on the end walls 41 with end plates 7 and 8 for holding bearings 9 that support the rotation shaft 3 of the rotor 2, respectively. FIG. 1 shows a state where the first case 5 and the end plate 7 are separated from each other. The first case 5 and the second case 6 cover the entire stator 10 with inner diameters of the cylindrical parts 40 matching outer diameters of the disk parts 14a and 14b, respectively. The first case 5 and the second case 6 are coupled to each other by welding, together with the disk parts 14a and 14b, such that open end edges of The first case 5 and the second case 6 abut each other at a position corresponding to joining faces between the disk parts 14a and 14b of the insert molded component 20 on the outer circumferential edges of the disk parts 14a and 14b.

Figure 3A:
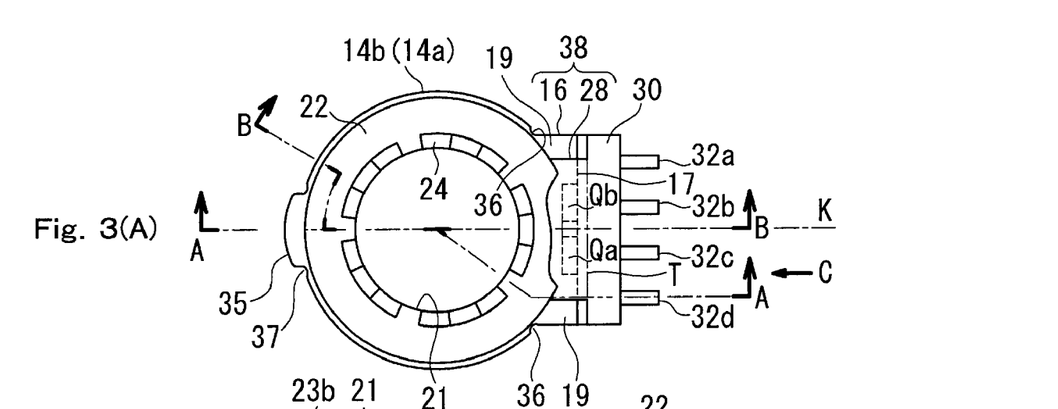
FIGS. 3A to 3D are detailed diagrams of an insert molded component.
Figure 3B:
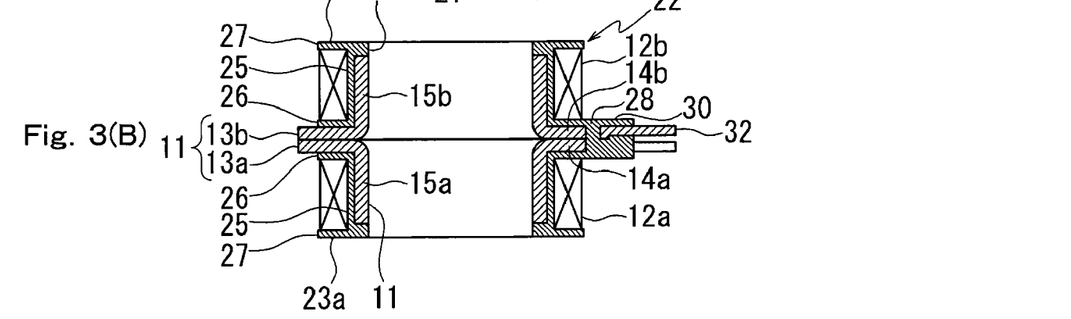
Figure 3C:
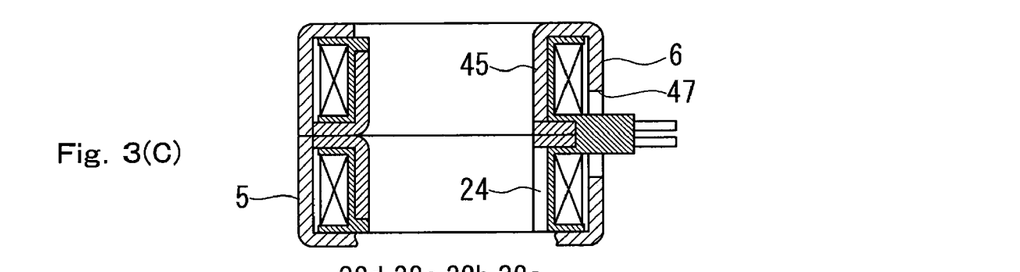
Figure 3D:
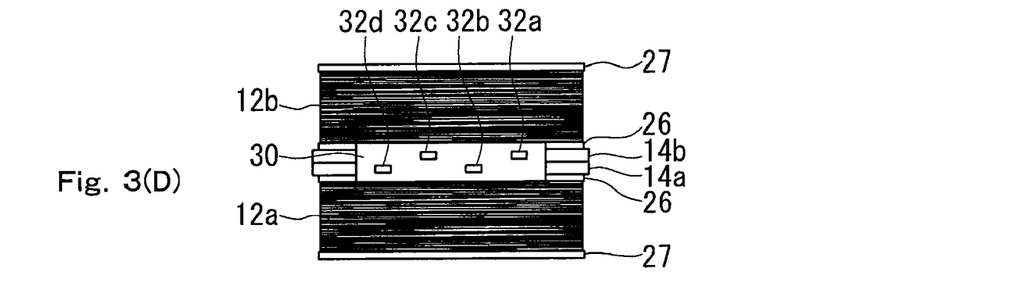

Next, the insert molded component 20 is described in detail. Hereinafter, regarding those plurally provided parts, such as the inner cores 13a and 13b, the pole teeth 15a and 15b, the coil winding parts 23a and 23b, and the pole teeth 45 in both of the first case 5 and the second case 6, common features thereof will be described with no identifying symbols being specified, while the identifying symbols will be added in a case where those plural parts need to be distinguished from each other. FIG. 3A is an axial plan view of the insert molded component 20, FIG. 3B is a cross-sectional view cut along a line A-A in FIG. 3A, FIG. 3C is a cross-sectional view cut along a line B-B in FIG. 3A, and FIG. 3D is a side view seen from a direction C in FIG. 3A. FIG. 3C also shows the first case 5 and the second case 6. In order to simplify the illustrations, FIGS. 3B and 3C do not show the shape of the wall face of the through hole 21 behind the cutting line.

The coil winding parts 23a and 23b are formed on the respective outer ends in the axial direction with interposed therebetween the disk parts 14a and 14b of the paired inner cores 11 that include the inner cores 13a and 13b laminated together. As described above, in the through hole 21 formed to allow shaft parts 25 of the coil winding parts 23a and 23b to pass therethrough, the pole teeth 15a and 15b of the paired inner cores 11 are provided such that the inner peripheral faces thereof coincide with the inner peripheral face of the through hole 21.

The through hole 21 is further provided between the adjacent pole teeth 15a as well as between the adjacent pole teeth 15b with tooth receiving recesses 24 that receive the pole teeth 45 of the first case 5 and the second case 6. The tooth receiving recesses 24 each have a trapezoidal shape matching the shape of the pole tooth 45 with a radial depth matching the thickness of the pole tooth 45. The tooth receiving recesses are formed such that the inner peripheral faces of the pole teeth 45 coincide with the inner peripheral face of the through hole 21 in a state where the first case 5 and the second case 6 are placed to cover the insert molded component. Accordingly, there is formed on the inner peripheral face of the through hole 21 a stator core including the pole teeth 15a and 15b and the pole teeth 45 that are alternately aligned in the circumferential direction.

The coil winding parts 23a and 23b each have the shaft part 25 and flange parts 26 and 27 provided on respective ends of the shaft part. The disk parts 14a and 14b have an outer diameter slightly larger than those of the flange parts 26 and 27 so as not to allow the resin to reach the circumferential faces of the disk parts. The flange parts 26 have a plate shape so as to be attached to the disk parts 14a and 14b, respectively. The flange parts 26 of the coil winding parts 23a and 23b are connected with each other in spaces between the adjacent pole teeth 15a and 15b so as to form the integrally coupled coil bobbin 22.

The coil bobbin 22 has an extending part 38 that extends perpendicularly to the axial direction from the axial center corresponding to the disk parts. The terminal block 30 is provided at a tip end of the extending part. The extending part 38 has terminal block holding parts 16 that are formed on a radial line "K" so as to be integrally continuous from the disk parts 14a and 14b, and a resin connection part 28 that extends outward on a plane of the terminal block holding parts 16 so as to be integrally continuous from the flange parts 26. The terminal block 30 supports the terminal pins 32 (32a, 32b, 32c, and 32d) that are aligned parallel to each other so as to be symmetrical about the radial line "K" when axially viewed.

Figure 4:
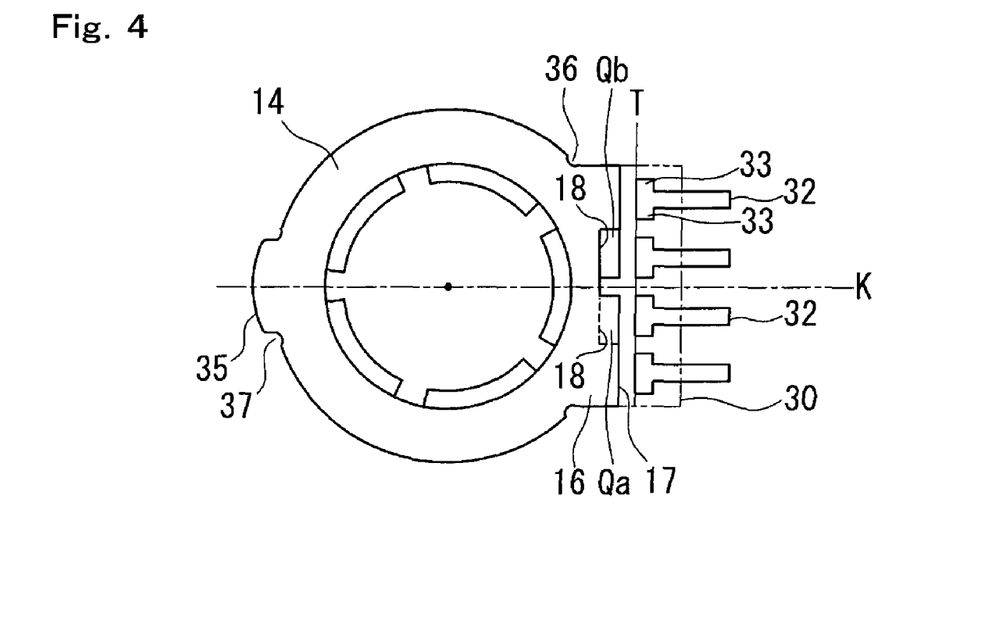
FIG. 4 is another detailed diagram of the insert molded component.

As shown in FIG. 4 to be referred to later, the terminal pins 32 each have a T-letter shape such that jut parts 33 extend from an end close to the inner cores 13a and 13b, namely, a base end covered with the resin, in respective directions perpendicular to the longitudinal direction of the terminal pin. These jut parts 33 are aligned on a straight line. The terminal block 30 is defined by a compartment line "T" that is obtained by connecting ends of the linearly aligned jut parts 33 on the side close to the disk parts 14a and 14b. The other ends of the terminal pins 32 protrude outward from the terminal block 30, and are also linearly aligned when axially viewed. Particularly shown in FIG. 3D, the terminal pins 32a, 32b, 32c, and 32d have heights (in the axial direction of the coil bobbin 22) alternately different from each other when viewed from outside along the direction of protrusion thereof.

The disk parts 14a and 14b each have the terminal block holding part 16 that faces the terminal block 30. The terminal block holding part 16 has a width identical with that of a cutout part 47 (to be described later) provided in each case, and juts into a rectangular shape integrally from the circumferential edge of the disk part 14a or 14b. The terminal block 30 is set to have a width identical with that of the terminal block holding parts 16. Adjacent to each side end of the base end of the terminal block holding part 16, namely, on the circumferential edge of each of the disk parts 14a and 14b, there is formed an escaping recess 36 that is concave inward. In the terminal block holding part 16, a terminal block facing end 17, which faces the compartment line "T" of the terminal block 30, has a basal line extending parallel to the compartment line "T" of the terminal block 30 with a predetermined space provided therebetween.

The resin connection part 28 extends integrally and continuously from the flange parts 26 that are attached respectively to the disk parts 14a and 14b, so as to form the extending part 38 in cooperation with the terminal block holding parts 16. The resin connection part 28 fills the space between the terminal block holding parts 16 and the terminal block 30 so as to be connected with the terminal block 30.

FIG. 4 shows details of the connection portion between the terminal block holding parts 16 and the terminal block 30. The terminal block holding parts 16 of the inner cores 13a and 13b are provided respectively with recesses Qa and Qb that are opened in the axial direction. More specifically, the recesses Qa and Qb according to the present embodiment are provided as passing through parts that are opened in the axial direction. The terminal block holding parts 16 of the inner cores 13a and 13b are each provided on the terminal block facing end 17 with a rectangular cutout 18 that is cut out radially inward. The cutout 18 is cut out radially inward in the terminal block facing end 17 so as to have a constant width.

The longitudinal center of the cutout is offset with respect to the radial line "K" and the position of the radial line "K" is included in the longitudinal range thereof. In other words, the radial line "K" runs across the cutout 18. As shown in FIGS. 2 and 4, in the terminal block holding parts 16 provided respectively with the cutouts 18 thus configured in the paired inner cores 11 of the inner cores 13a and 13b facing back to back, the cutout 18 in the inner core 13a is partially overlapped with the terminal block holding part 16 of the inner core 13b when axially viewed so as to be sealed by this overlapped portion.

Similarly, the cutout 18 in the inner core 13b is partially overlapped with the terminal block holding part 16 of the inner core 13a when axially viewed so as to be sealed by this overlapped portion. In other words, the paired inner cores 11 include the recess Qa that is concave in the axial surface by the cutout 18 formed in the terminal block holding part 16 of the inner core 13a and the terminal block holding part 16 of the inner core 13b, as well as the recess Qb that is concave in the axial surface by the cutout 18 formed in the terminal block holding part 16 of the inner core 13b and the terminal block holding part 16 of the inner core 13a. Similarly to the cutouts 18, the recesses Qa and Qb each have a length divided by the radial line "K" into a longer portion and a shorter portion.

The cutout 18 formed in the terminal block holding part 16 of the inner core 13a and the cutout 18 formed in the terminal block holding part 16 of the inner core 13b are partially overlapped with each other. More specifically, in the paired inner cores 11, the cutouts 18 are overlapped with each other in a short portion inclusive of the radial line "K". The recesses Qa and Qb are axially opened in this overlapped portion between the cutouts 18.

As shown in FIG. 1 and FIGS. 3A to 3D, the resin connection part 28 extends on the terminal block holding parts 16 from the flange parts 26 attached to the disk parts 14a and 14b, and fills the space between the terminal block holding parts 16 and the terminal block 30 so as to connect the terminal block holding parts 16 and the terminal block 30 with each other. The resin connection part 28 on the respective inner cores 13a and 13b fills the respective recesses Qa and Qb on the terminal block holding parts 16, and connects the upper part and the lower part with each other in the overlapped portion between the recesses Qa and Qb, namely, the recesses Qa and Qb axially opened in the overlapped portion between the cutouts 18. While covering the recesses Qa and Qb in the respective terminal block holding parts 16, the resin connection part 28 is set to have a width smaller than that of the terminal block holding parts 16. Accordingly, there are formed exposed parts 19 at respective ends in the width direction of the resin connection part 28 between the coil bobbin 22 and the terminal block 30. In each of the exposed parts, the metal portion of the terminal block holding part 16 is not covered with the resin.

Figure 5:
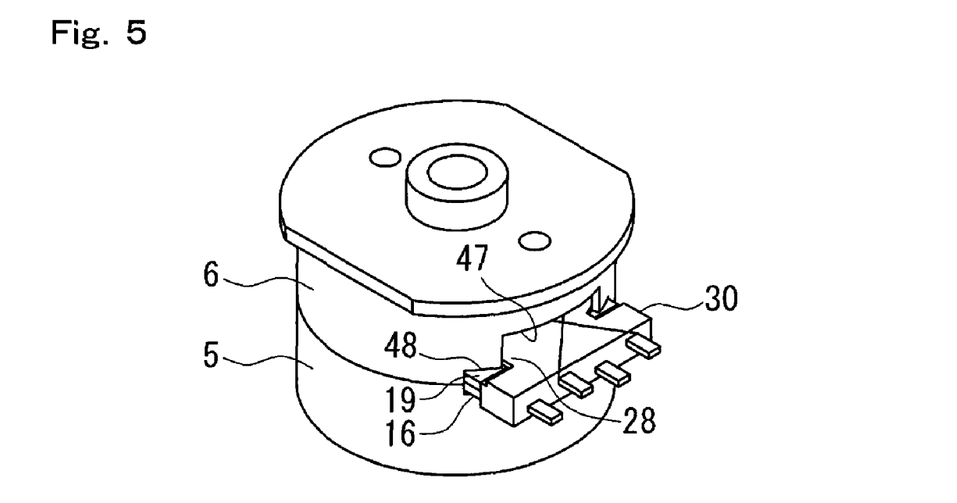
FIG. 5 is a perspective view showing a cutout part and the periphery thereof with cases being mounted.

The cylindrical parts 40 of the first case 5 and the second case 6 are provided on the open end edges thereof with the cutout parts 47, respectively, which allow the extending part 38 to pass therethrough. The cutout parts 47 have an axial depth enough to prevent the first case 5 and the second case 6 from touching the ends of the coils 12a and 12b drawn out from the coil bobbin 22 in the cases to the terminal pins 32 on the terminal block 30. As shown in FIG. 5, each of the cutout parts 47 is provided on respective ends with contact parts 48 that abut with the exposed parts 19 of the terminal block holding part 16.

Figure 6A:
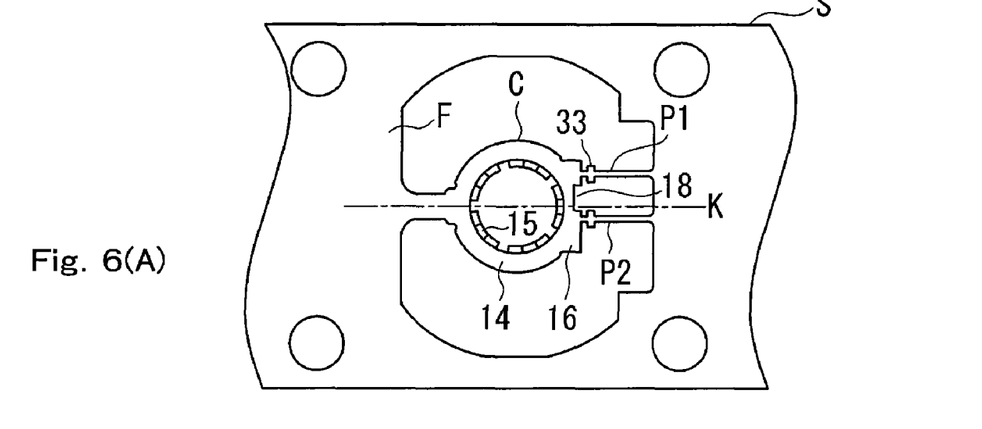
FIGS. 6A to 6C are views each illustrating a process of manufacturing the insert molded component.

The insert molded component 20 described above is manufactured in a method similar to that shown in Japanese Unexamined Patent Publication No. 2003-88062. FIG. 6A shows a steel plate "S" with portions to serve as the inner core and the terminal pins being pressed and punched out. In the following description, the disk parts 14a and 14b are referred to as "disk parts 14" and the pole teeth 15a and 15b are referred to as "pole teeth 15." The pole teeth 15 rise from the disk part 14 in a state where an inner core part "C" and terminal pin parts P1 and P2 are each connected with a peripheral frame part "F" and the terminal block holding part 16 of the inner core part "C" is connected with the terminal pin parts P1 and P2, respectively. The terminal pin parts P1 and P2 are set so as to correspond to every other pin such that, on the terminal block 30, the terminal pin part P1 corresponds to the outermost pin (the terminal pin 32a or 32d shown in FIGS. 3A and 3D) and the terminal pin part P2 corresponds to the third pin (the terminal pin 32c or 32b shown in FIGS. 3A and 3D) from the outermost end with the second pin being skipped. These two terminal pin parts P1 and P2 are placed so as to be oppositely and unequally distant from the radial line "K" drawn from the center of the disk part 14.

The terminal pin parts P1 and P2 are spaced apart from each other with the cutout 18 being provided therebetween when viewed in a direction parallel to the radial line "K". In other words, the cutout 18 in the terminal block holding part 16 is provided so as not to be overlapped with any of the terminal pin parts P1 and P2. Such a structure simplifies the shape of a press die used to form the cutout 18. In the state shown in FIG. 6A, portions close to the frame part "F" in the terminal pin parts P1 and P2 excluding the portions connected with the jut parts 33 are molded into a thin piece with use of a crushing machine (not shown). Removed along with this molding process are sharp warped portions that are generated upon pressing and punching out the terminal pin parts P1 and P2.

Figure 6B:
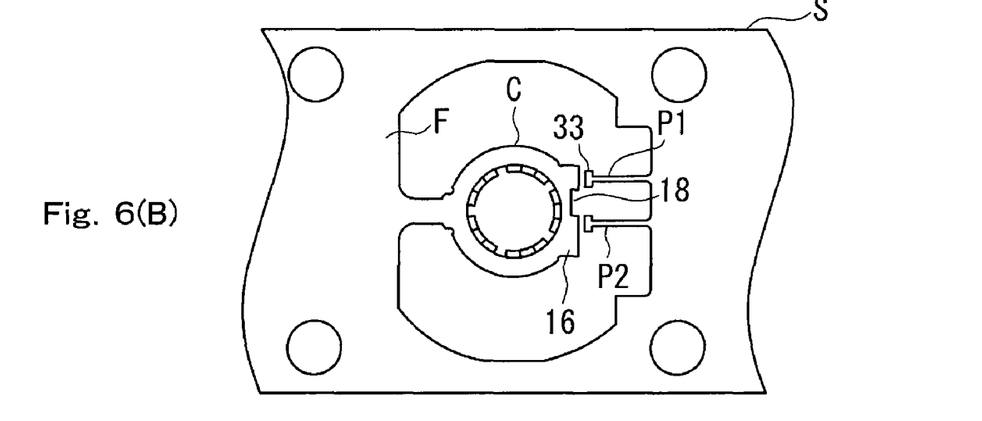

Then, as shown in FIG. 6B, the inner core part "C" and the terminal pin parts P1 and P2 are cut apart from each other, and the jut parts 33 are provided to configure a T-letter shape at the tip end of each of the terminal pin parts "P" facing the inner core part "C" (the terminal block holding part 16). Two punched out steel plates "S" thus produced are placed such that the terminal block holding parts 16 are aligned with each other and the disk parts 14 face back to back with the pole teeth 15 extending in the opposite directions, thereby obtaining an insert member.

Figure 6C:
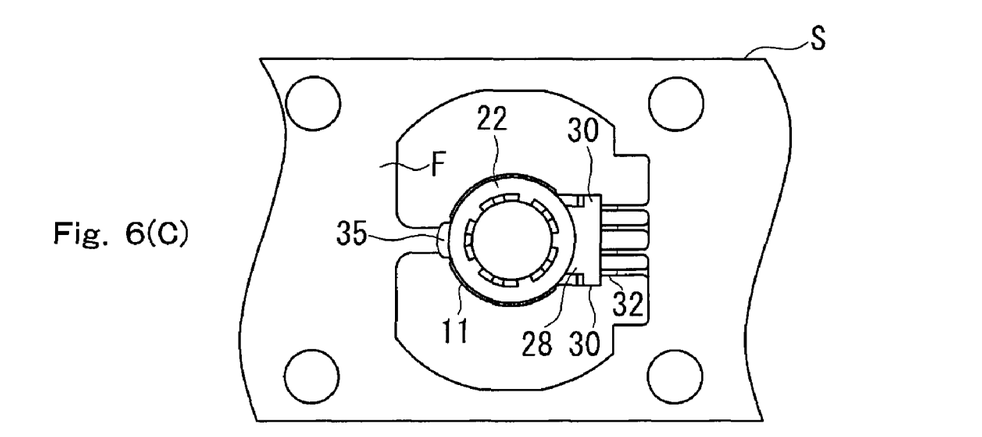

This insert member is set in a molding machine (not shown) to insert mold the inner core parts "C" and the terminal pin parts P1 and P2, so that, as shown in FIG. 6C, there are formed the coil bobbin 22, the resin connection part 28, and the terminal block 30. After the insert molding, the connected portions between the inner core parts "C" and the frame parts "F" as well as the connected portions between the terminal pin parts P1 and P2 and the frame parts "F" are cut apart from each other, thereby obtaining the insert molded component 20. The inner core parts "C" facing back to back serve as the paired inner cores 11, while the terminal pin parts P1 and P2 serve as the terminal pins 32. The paired inner cores 11 (the inner core parts "C") can be cut apart from the frame parts "F" along the circular shape of the outer circumferences of the disk parts 14.

In a case where there are left tongue-shaped pieces 35, the first case 5 and the second case 6 are provided on the open end edges thereof with cutouts (not shown) so as not to be in contact with the tongue-shaped pieces 35. FIGS. 3A to 3D and 4 each show an example with the tongue-shaped pieces 35 being left. Similarly to the base end of the terminal block holding part 16, there are formed escaping recesses 37 in the circumferential edge of each of the disk parts 14 adjacent to side ends of the tongue-shaped piece 35.

As already described, the two terminal pin parts P1 and P2 are spaced apart from each other with the cutout 18 interposed therebetween on a plane identical with that of the terminal block holding part 16 of the inner core part "C". Disposed adjacent to these pin parts are the two terminal pin parts P1 and P2 on a plane identical with that of the terminal block holding part 16 of the other inner core part "C" facing back to back. As shown in FIG. 3D, the terminal pins 32 protruding from the terminal block 30 have alternately different heights in the axial direction of the coil bobbin 22. As a result, increased is the distance between the adjacent terminal pins 32, which facilitates to secure an enough space for a nozzle used to wind each end of the coils 12a and 12b around each of the terminal pins 32 in the process of winding the coils.

The inner core 13 according to the present embodiment corresponds to a core of the invention, the paired inner cores 11 correspond to paired cores, and the disk part 14 corresponds to a base part.

In the above structure according to the present embodiment, the stepping motor 1 includes: the rotor 2 having the rotation shaft 3 and the magnets 4a and 4b provided on the rotation shaft; the stator 10 having the inner cores 13a and 13b provided with the pole teeth 15a and 15b on the inner circumferences thereof surrounding the magnets 4a and 4b, and the coils 12a and 12b wound around the outer circumferences of the inner cores; and the terminal block 30 supporting the terminal pins 32 to be connected with the ends of the coils 12a and 12b, wherein the inner cores 13a and 13b each have the terminal block holding part 16, the terminal block 30 is located radially outside the terminal block holding parts 16 and is connected to the terminal block holding parts 16 via the insert-molded resin connection part 28, the terminal block holding parts 16 are provided with the axially opened recesses Qa and Qb respectively, and the recesses Qa and Qb are filled by the resin connection part 28. Therefore, the resin connection part 28 is made thicker to fill the recesses Qa and Qb on the terminal block holding parts 16 that are connected with the terminal block 30, and the differences in height between the outer faces of the terminal block holding parts 16 and the recesses Qa and Qb serve as portions to hook the resin filling the recesses Qa and Qb, resulting in an increased strength to support the terminal block 30 and less possibility of bending of or damages to the connection portion. Furthermore, deterioration in strength is prevented even upon heating to solder the terminal pins 32.

In particular, the inner cores 13a and 13b serving as the paired inner cores 11 have the double-layered pole teeth 15a and 15b that protrude oppositely in the axial direction. The recesses formed in the terminal block holding parts 16 are embodied as the recess Qa opened axially in one direction in correspondence with the pole teeth 15a in one of the layers and the recess Qb opened axially in the other direction in correspondence with the pole teeth 15b in the other layer. Provision of the recesses Qa and Qb on the respective sides in the axial direction realizes the increased thickness and the hooks on respective faces of the resin connection part 28, thereby resulting particularly in an increased strength to hold the terminal block 30.

The two inner cores 13a and 13b serve as the paired inner cores 11 that have the plate-shaped disk parts 14a and 14b and the pole teeth 15a and 15b protruding axially in the respective directions from the disk parts 14a and 14b. The disk parts 14a and 14b are provided with the terminal block holding parts 16 and are placed to face back to back such that the paired inner cores have the double-layered pole teeth. The cutout 18 provided in one of the terminal block holding parts 16 forms the recess Qa opened axially in one direction and the cutout 18 provided in the other terminal block holding part 16 forms the recess Qb opened axially in the other direction. Therefore, the paired inner cores 11 provided with the double-layered pole teeth 15a and 15b can be formed with use of simple pressed members. Moreover, the portions to hook the resin are provided as the differences in height between the outer faces of the terminal block holding parts 16 and the recesses Qa and Qb, respectively, which secure the strength particularly in the width direction to support the terminal block 30.

In the inner cores 13a and 13b, the terminal block holding parts 16 extend outward from the disk parts 14a and 14b with a predetermined width, and each have the terminal block facing end 17 perpendicular to the radial line "K" drawn from the center of the disk parts 14a and 14b. The cutout 18 is formed in each of the terminal block facing ends 17. The longitudinal center of each of the cutouts 18 along the terminal block facing end 17 is offset with respect to the radial line "K".

The bottom of each of the recesses Qa and Qb provided in the respective terminal block holding parts 16 is sealed at least partially by the other terminal block holding part 16. Accordingly, even in a case where a predetermined space cannot be provided between the terminal block facing end 17 of the first inner core 13a and the terminal block 30 due to the cutout 18, the predetermined space can be secured between the terminal block facing end 17 of the second inner core 13b and the terminal block 30, so that the constant space parallel to the terminal block 30 can be secured mostly on the terminal block facing ends 17. As a result, the terminal block can be prevented from being unstable.

In the two inner cores 13a and 13b attached to each other, the cutouts 18 provided respectively in the inner cores 13a and 13b are offset in different directions, thereby exerting an effect similar to that obtained by formation of wide-ranged cutouts. Although the recesses Qa and Qb are formed by the cutouts 18, the bottom of each of the recesses is sealed by the other terminal block holding part 16. Thus, the resin connection part 28 is also in contact with the other terminal block holding part 16 serving as the sealing lid. It is therefore possible to secure an area of contact between the resin connection part 28 and the terminal block holding parts 16, resulting in an increased strength to support the terminal block 30.

Among the four terminal pins 32 being provided, two of the terminal pins of the first and third from the outermost end in the width direction of the terminal block 30 are located on a plane identical with that of the terminal block holding part 16 of the first inner core 13a, while the remaining two pins are located on a plane identical with that of the terminal block holding part 16 of the second inner core 13b. When viewed in a direction parallel to the radial line "K", the two terminal pins 32 on the plane identical with that of each of the terminal block holding parts 16 are disposed to be spaced apart from each other with the recess Qa or Qb in the corresponding terminal block holding part 16 being interposed therebetween.

Accordingly simplified is the shape of the press die used to form the cutout 18 upon manufacturing the terminal pins 32 and the inner cores 13a and 13b by pressing and punching out plate members. The two terminal pins 32 located on the plane identical with that of each of the terminal block holding parts 16 do not face the recess Qa or Qb provided in the corresponding terminal block holding part 16 but are disposed adjacent to the terminal block holding part 16 while facing a straight line along the terminal block facing end 17. Therefore, heat can be effectively released from the terminal pins 32 to the terminal block holding part 16 with no restriction by the recess Qa or Qb.

The cutouts 18 each run from one side to another side across the radial line "K". In the two inner cores 13a and 13b facing back to back, the cutouts 18 of the two inner cores 13a and 13b are partially overlapped with each other. Accordingly, the resin connection part 28 filling the recesses Qa and Qb in the respective terminal block holding parts 16 is continuously provided in the overlapped portion between the cutouts 18. In addition to the fact that the resin connection part 28 on the respective outer faces of the terminal block holding parts 16 is continuously provided to fill the spaces between the terminal block facing ends 17 and the terminal block 30, the resin connection part is continuously provided in the overlapped portion between the cutouts 18. Therefore prevented is separation of the resin connection part 28 from the paired inner cores 11.

In the stator 10, the insert molded component 20 is formed by insert molding, inclusive of the resin connection part 28 and the resin coil bobbin 22 connected integrally with each other. The coil bobbin 22 has the pole teeth 15a and 15b of the paired inner cores 11, disposed in the through hole 21 for the rotor 2 to pass therethrough, and also has the coil winding parts 23a and 23b on the outer circumference thereof. As the terminal block 30 is formed integrally with the coil bobbin 22 via the resin connection part 28, the strength of the terminal block 30 is increased relative to a case where the terminal block is simply fixed to the inner cores 13a and 13b. The coil bobbin 22 is particularly durable against an external force in the lateral direction as the coil bobbin is formed into the circular ring shape and the portion connected by the resin connection part 28 extends along the width direction of the terminal block 30. In addition, the number of components is reduced and the assembling work is thus facilitated.

The first case 5 and the second case 6 each provided with the bearing 9 for supporting the rotor 2 are placed to cover the insert molded component 20 from the respective ends in the axial direction. The resin connection part 28 extends toward the terminal block 30 on the radial line "K" with a width smaller than that of the terminal block holding parts 16, so that each of the terminal block holding parts 16 is axially exposed from the both ends in the width direction of the resin connection part 28. At least one of the first case 5 and the second case 6 is brought into contact with the corresponding exposed terminal block holding part 16. In this structure, upon soldering to the terminal pins 32 the ends of the coils wound around the coil bobbin 22, heat transferred from the terminal pins 32 to the terminal block 30 as well as to the resin connection part 28 is transferred from the metal terminal block holding parts 16 to the first case 5 and the second case 6 in contact with the exposed portions of the terminal block holding parts so as to be rapidly released. As a result, heat resistance is improved at the resin connection part 28 as well as at the terminal block 30.

In the present embodiment, the pole teeth 15a and 15b of the paired inner cores 11 have five teeth in one layer, and the pole teeth 45 of each of the first case 5 and the second case 6 each serving as the outer core are provided with five teeth. However, the numbers of the pole teeth are not limited to the above case, but may be set in accordance with the fineness of the required steps. Further, the pole teeth 15a and 15b each have a chevron shape with the tip end in a circular shape, while the pole teeth 45 each have a trapezoidal shape. Alternatively, each of these shapes can be arbitrarily set such as into a pectinate shape.

The first case 5 and the second case 6 abut each other at the position corresponding to the joining faces between the disk parts 14a and 14b on the outer circumferential edges of the disk parts. Alternatively, the outer diameters of the disk parts 14a and 14b may be set substantially equal to the outer diameters of the cylindrical parts 40 of the first case 5 and the second case 6, so that the end edges of the cylindrical parts 40 are allowed to abut with the disk parts 14a and 14b to clip the disk parts.

The terminal pins 32 are formed simultaneously with the inner cores 13 by pressing and punching out the steel plates "S" and are provided on the terminal block 30 by insert molding. However, the present invention is not limited to the above case. Alternatively, outsert molding may be adopted such that the terminal block is insert molded into the paired inner cores 11 with no terminal pins provided and then the terminal pins are to be press fitted into the terminal block. In this case, each of the terminal pins preferably has the tip end in a pointed shape rather than being formed into the T-letter shape, in view of assembling work and securement of support property. Furthermore, the present embodiment adopts molding the terminal block 30 integrally with the coil bobbin 22. Alternatively, irrespective of whether or not the coil bobbin 22 is integrally molded, only the terminal block with or without the terminal pins 32 may be insert molded into the paired inner cores 11. While the outer core and the case are integrally provided in the present embodiment, the outer core and the case may be formed separately from each other. In such a case, the terminal block may be formed onto the outer core. In the case where the terminal block is formed onto the outer core, the case may be formed integrally with the inner core.

The present invention is particularly useful to be applied to a small motor having a terminal block formed integrally with a core of a stator.

While this invention has been described in conjunction with the specific embodiments outlined above, it is evident that many alternatives, modifications, and variations will be apparent to those skilled in the art. Accordingly, the preferred embodiments of the invention as set forth are intended to be illustrative, not limiting. Various changes may be made without departing for the spirit and scope of the inventions as defined in the following claims.

What is claimed is:

1. A motor comprising:
a rotor including;
   a rotation shaft; and
   a magnet thereon;
a stator including;
   a core provided with pole teeth on an inner circumference to surround the magnet; and
   a coil wound around outer peripheries of the pole teeth; and
a terminal block for supporting a plurality of terminal pins to be connected with ends of the coil;
wherein the core has a terminal block holding part, the terminal block being located radially outside the terminal block holding part so as to be connected with the terminal block holding part via a resin connection part;
wherein the terminal block holding part has a recess axially opened and filled by the resin connection part;
wherein the core has the pole teeth in two layers directed axially in directions opposite from each other;
wherein the terminal block holding part has the recess opened axially in one direction in correspondence with the pole teeth in one of the layers;
wherein another recess is opened axially in another direction in correspondence with the pole teeth in the other layer;
wherein the core is divided into two cores in a pair, each having a plate-shaped base part and the pole teeth directed axially in one of the directions from the base part that has the terminal block holding part;
wherein the base parts of the paired cores facing back to back;
wherein each of the terminal block holding parts are provided with a cutout;
wherein the cutout formed in one of the terminal block holding parts serves as the recess opened axially in one direction, while the cutout formed in the other terminal block holding part serves as the recess opened axially in the other direction;
wherein the base part of each of the two cores has a disk part provided with the pole teeth on an inner circumference thereof;
wherein the terminal block holding part extends outward from the disk part with a predetermined width so as to have a terminal block facing end perpendicular to a radial line from a center of the disk part;
wherein the cutout is formed in the terminal block facing end:
wherein a center in a length of the cutout along the terminal block facing end is offset with respect to the radial line; and
wherein each of the recesses formed in the corresponding terminal block holding part has a bottom sealed at least partially by the other terminal block holding part.

2. The motor according to claim 1;
wherein four terminal pins are provided as the plurality of terminal pins, two of the pins of first and third from an outermost end in a width direction of the terminal block are located on a plane identical with that of the terminal block holding part of one of the inner cores, while the remaining two pins are located on a plane identical with that of the terminal block holding part of the other inner core; and
wherein when viewed in a direction parallel to the radial line, the two terminal pins on the plane identical with that of one of the terminal block holding parts are disposed so as to be spaced apart from the remaining two terminal pins on the plane identical with that of the other terminal block holding part with the recesses being interposed therebetween.

3. The motor according to claim 1;
wherein the cutouts each run from one side to another side across the radial line;
wherein the cutouts in the two cores facing back to back are partially overlapped with each other; and
wherein the resin connection part filling the recesses of the respective terminal block holding parts is continuously provided in an overlapped portion between the cutouts.

4. The motor according claim 1;
wherein the stator includes a resin coil bobbin insert molded so as to have the pole teeth on an inner periphery of a through hole for the rotor to pass therethrough;
wherein a coil winding part on the outer peripheries of the pole teeth; and
wherein the resin connection part and the coil bobbin are connected with each other to form an integral insert molded component.

* * * * *